United States Patent
Wu (10) Patent No.: US 12,009,864 B2
(45) Date of Patent: Jun. 11, 2024

(54) OPTICAL TRANSMITTER, OPTICAL TRANSMISSION SYSTEM, AND METHOD OF TRANSMITTING AN OPTICAL SIGNAL

(71) Applicant: NEC Corporation, Tokyo (JP)

(72) Inventor: Mingqi Wu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/795,934

(22) PCT Filed: Feb. 10, 2020

(86) PCT No.: PCT/JP2020/005125
§ 371 (c)(1),
(2) Date: Jul. 28, 2022

(87) PCT Pub. No.: WO2021/161383
PCT Pub. Date: Aug. 19, 2021

(65) Prior Publication Data
US 2023/0057029 A1    Feb. 23, 2023

(51) Int. Cl.
*H04B 10/50* (2013.01)
*G02F 1/01* (2006.01)
(52) U.S. Cl.
CPC ..... *H04B 10/50575* (2013.01); *G02F 1/0123* (2013.01)
(58) Field of Classification Search
CPC ................ H04B 10/50575; G02F 1/0123
USPC ............................................. 398/198
See application file for complete search history.

(56) References Cited

U.S. PATENT DOCUMENTS

| 9,853,737 | B2* | 12/2017 | Rasmussen | H04B 10/541 |
| 2003/0147577 | A1* | 8/2003 | Kataoka | H04B 10/564 385/3 |
| 2008/0175598 | A1* | 7/2008 | Cho | H04B 10/505 398/183 |
| 2011/0013907 | A1* | 1/2011 | Sugihara | G02F 1/0123 398/38 |
| 2015/0207569 | A1 | 7/2015 | Bhandare et al. | |
| 2015/0270905 | A1 | 9/2015 | Rasmussen et al. | |
| 2017/0033871 | A1* | 2/2017 | Nishimoto | H04L 27/0008 |

(Continued)

FOREIGN PATENT DOCUMENTS

| JP | 2004318052 A * | 11/2004 | G02F 1/0327 |
| JP | 2014-032274 A | 2/2014 | |
| WO | 2016/152128 A1 | 9/2016 | |

OTHER PUBLICATIONS

Pang et al; Flexible Bias Control for a Mach-Zehnder Modulator Based on a Two-Layer Neural Network Algorithm; 2019; Optical Society of America; pp. 1-3. (Year: 2019).*

(Continued)

*Primary Examiner* — Amritbir K Sandhu
(74) *Attorney, Agent, or Firm* — Sughrue Mion, PLLC (57) ABSTRACT

To carry out automatic bias control to an optical modulator without a dither signal with reduced cost, an optical transmitter comprises a light source configured to output a light, an optical first modulator configured to modulate the light and output a first modulated optical signal, a DC component detector configured to detect a DC component of the first modulated optical signal and a controller configured to apply a first specific bias voltage identified based on the DC component to the optical first modulator.

6 Claims, 12 Drawing Sheets

(56) References Cited

U.S. PATENT DOCUMENTS

2018/0191444 A1* 7/2018 Rasmussen ...... H04B 10/50575
2023/0057029 A1* 2/2023 Wu ................. H04B 10/50575

OTHER PUBLICATIONS

Pang et al; Flexible Bias Control for a Mach-Zehnder Modulator Based on a Two-Layer Neural Network Algorithm ;2019: OSA; pp. 1-3. (Year: 2019).*
International Search Report for PCT Application No. PCT/JP2020/005125, dated May 12, 2020.
Written opinion for PCT Application No. PCT/JP2020/005125, dated May 12, 2020.
J. C. M. Diniz, et al., "Optimization of DP-M-QAM transmitter using cooperative coevolutionary genetic algorithm," Journal of Lightwave Technology, vol. 36, No. 12, pp. 2450-2462, Jun. 15, 2018.

* cited by examiner

OPTICAL TRANSMITTER, OPTICAL TRANSMISSION SYSTEM, AND METHOD OF TRANSMITTING AN OPTICAL SIGNAL

TECHNICAL FIELD

The present invention relates to an optical transmitter, an optical transmission system, and a method of transmitting optical signal, in particular, to carry out automatic bias control to an optical modulator without a dither signal with reduced cost.

BACKGROUND ART

In an optical communication network, an optical transmitter outputs an optical signal modulated based on a drive voltage by an optical modulator. Quality of the optical signal is deteriorated by operation point fluctuation caused by temperature fluctuation and aging deterioration of the optical modulator. In order to suppress the operation point fluctuation, automatic bias control using a low frequency dither signal is adopted to the optical modulator. In the case of using the low frequency dither signal, however, an amplitude of a voltage applied to the optical modulator is changed by the low frequency dither signal and thereby the quality of the optical signal deteriorates.

In Non-Patent Literature 1 (NPL1), bias voltages applied to two parallel children Mach-Zehnder modulators (MZMs) and a parent Mach-Zehnder interferometer (MZI) in a quadrature amplitude modulator is adjusted without the low frequency dither signal.

CITATION LIST

Patent Literature

[PTL1] International Patent Publication WO 2016/152128

Non Patent Literature

[NPL1] J. C. M. Diniz, et al., "Optimization of DP-M-QAM transmitter using cooperative coevolutionary genetic algorithm," Journal of Lightwave Technology, vol. 36, no. 12, pp. 2450-2462, Jun. 15, 2018.

SUMMARY OF INVENTION

Technical Problem

The technology in NPL1 needs clock tone information for adjusting the bias voltages applied to the MZMs. In order to obtain the clock tone information, an expensive optical detector or an analog to digital converter (ADC) having the high sampling rate is needed.

An exemplary object of the invention is to provide an optical transmitter, an optical transmission system, and a method of transmitting optical signal, in particular, to carry out automatic bias control to an optical modulator without a dither signal with reduced cost.

Solution to Problem

An optical transmitter according to an exemplary aspect of the invention comprises an optical light source for outputting a light; a first optical modulator for modulating the light and outputting a first modulated optical signal; a direct current (DC) component detecting means for detecting DC component of the first modulated optical signal; and a controller for applying a first specific bias voltage identified based on the DC component to the first optical modulator.

An optical transmission system according to an exemplary aspect of the invention comprises an optical light source for outputting a light; a first optical modulator for modulating the light and outputting a first modulated optical signal; a DC component detecting means for detecting DC component of the first modulated optical signal; and a controller for applying a first specific bias voltage identified based on the DC component to the first optical modulator.

A method of transmitting an optical signal according to an exemplary aspect of the invention comprises outputting a light; outputting a first modulated signal which is the light modulated; detecting DC component of the first modulated signal; and applying a first specific bias voltage identified based on the DC component to the first optical modulator.

Advantageous Effects of Invention

An exemplary advantage according to the present invention that it can carry out automatic bias control to an optical modulator without a dither signal with reduced cost.

DESCRIPTION OF EMBODIMENTS

First Example Embodiment

Figure 1:
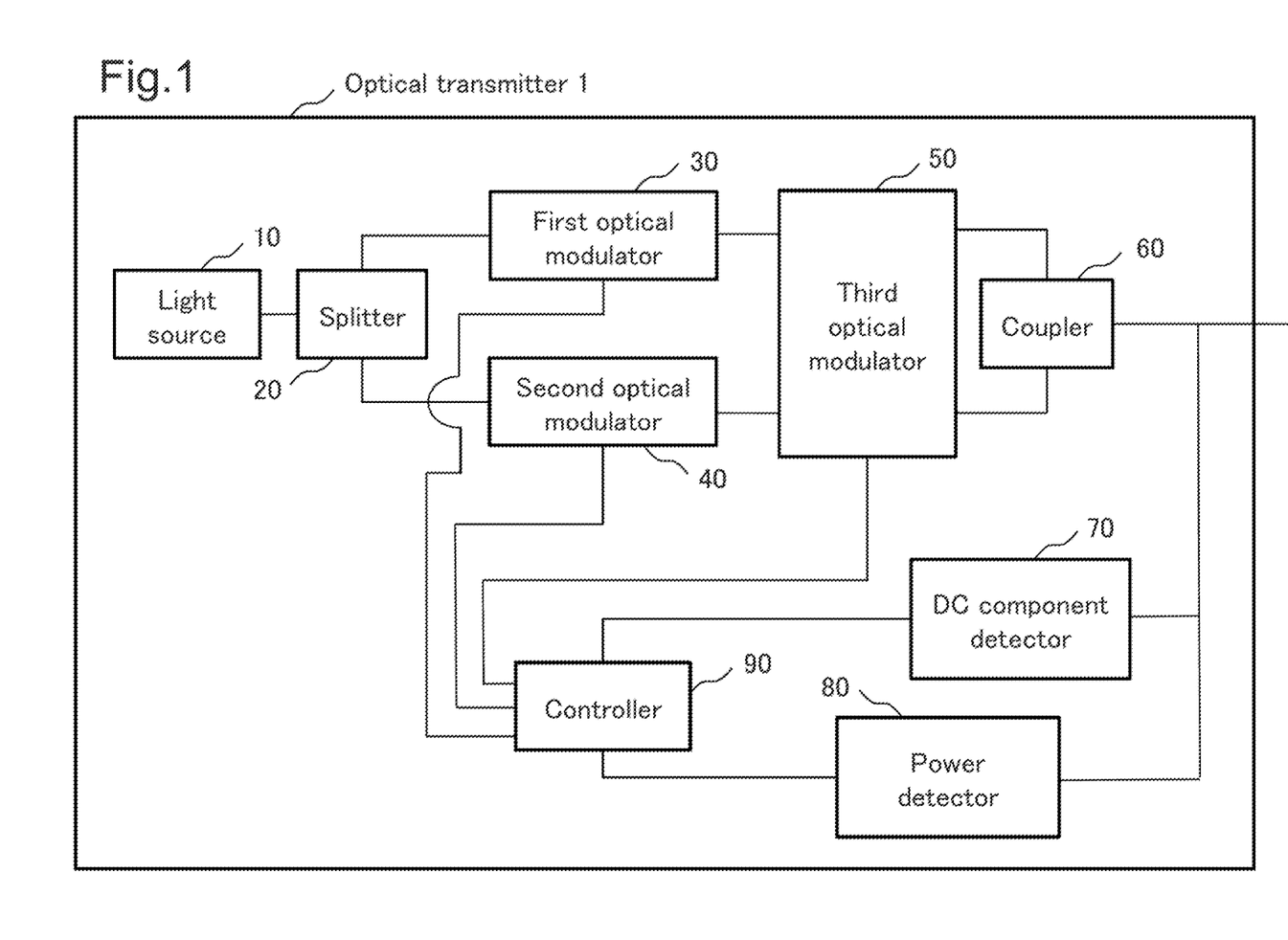
FIG. 1 is a block diagram illustrating configuration example of an optical transmitter in accordance with a first example embodiment of the present invention.

An optical transmitter 1 is explained based on the FIG. 1. FIG. 1 is a block diagram illustrating configuration example of the optical transmitter 1. The optical transmitter 1 outputs a modulated optical signal. For example, the optical transmitter 1 outputs Quadrature Amplitude Modulation (QAM) optical signal.

The optical transmitter 1 comprises a light source 10, a splitter 20, a first optical modulator 30, a second optical modulator 40, a third optical modulator 50, a coupler 60, a DC (direct current) component detector 70, a power detector 80 and a controller 90.

The light source 10 outputs a continuous light. For example, the light source 10 is a diode laser. The light source 10 is connected to the splitter 20.

The splitter 20 splits the light from the light source 10. The splitter 20 is connected to the light source 10, the first optical modulator 30 and the second optical modulator 40. The lights split by the splitter 20 are outputted to the first optical modulator 30 and the second optical modulator 40.

The first optical modulator 30 modulates one light split by the splitter 20 and outputs a first modulated optical signal. The first optical modulator 30 is connected to the splitter 20, the third optical modulator 50 and controller 90. For example, the first optical modulator 30 is an MZM. The first optical modulator 30 uses an amplitude modulation. The first optical modulator 30 modulates the light based on the bias voltage (Vci described later) applied by the controller 90 and a drive signal from a non-illustrated digital signal processor (DSP).

The second optical modulator 40 modulates the other light split by the splitter 20 and outputs a second modulated optical signal. The second optical modulator 40 is connected to the splitter 20, the first optical modulator 30 and controller 90. For example, the second optical modulator 40 is an MZM. The second optical modulator 40 uses an amplitude modulation. The second optical modulator 40 modulates the light based on the bias voltage (Vcq described later) applied by the controller 90 and a drive signal from a non-illustrated DSP.

The third optical modulator 50 adjusts a phase difference between the first modulated optical signal and the second modulated optical signal. The third optical modulator 50 is connected to the first optical modulator 30, the second optical modulator 40, the coupler 60 and the controller 90. For example, the third optical modulator is a Mach-Zehnder interferometer. The third optical modulator 50 adjusts the phase difference between the first modulated optical signal and the second modulated optical signal based on a bias voltage (Vp, described later) applied by the controller 90. Specifically, the third optical modulator 50 adjusts a phase difference so that the first modulated optical signal and the second modulated optical signal are orthogonal to each other.

The coupler 60 couples the first modulated optical signal and the second optical modulated signal and outputs a coupled optical signal.

Figure 2:
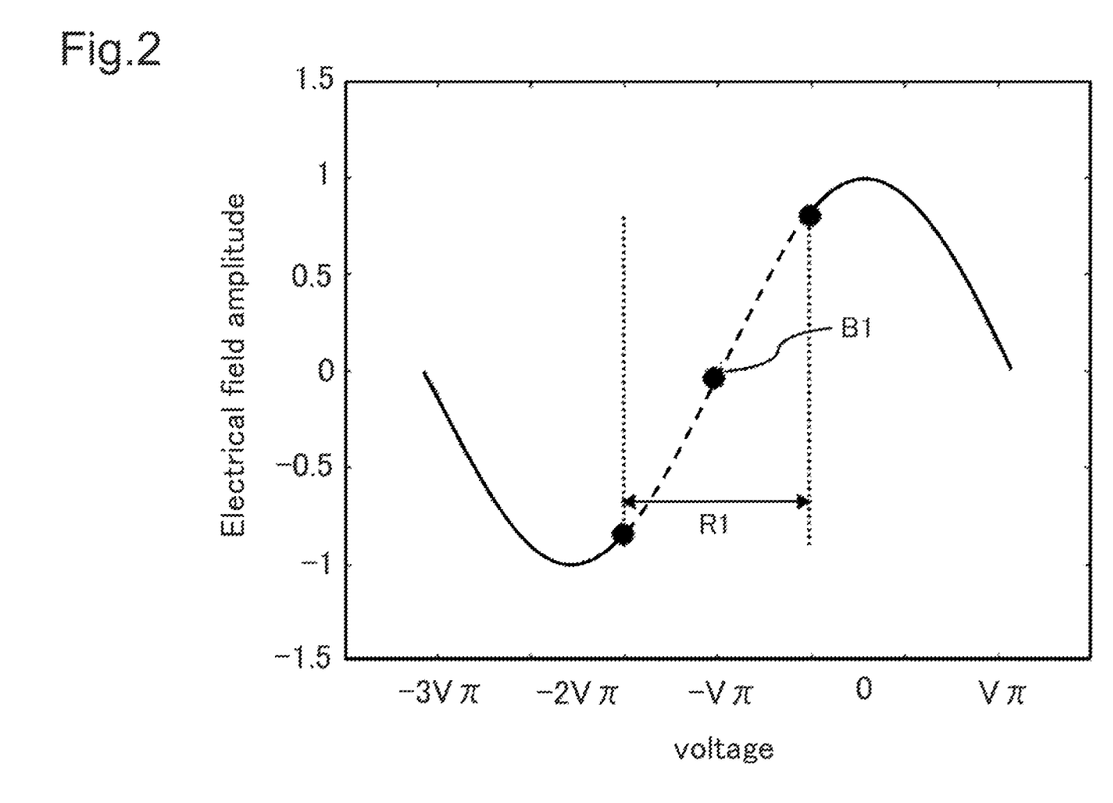
FIG. 2 is a drawing for explaining the optical transmitter in accordance with a first example embodiment of the present invention.
Figure 3:
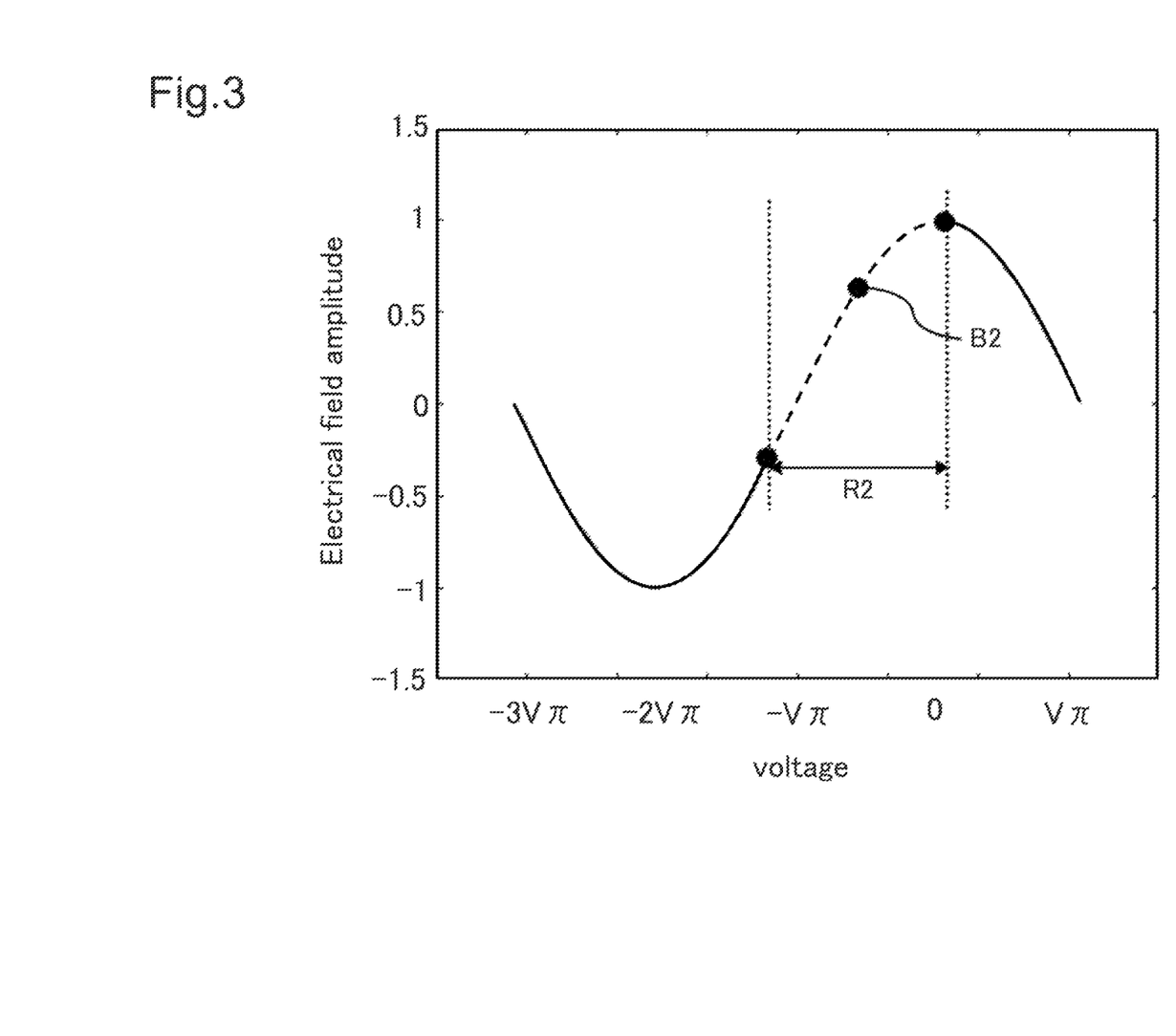
FIG. 3 is a drawing for explaining the optical transmitter in accordance with a first example embodiment of the present invention.

The DC component detector 70 detects a variance of a DC component of the coupled optical signal. The DC component is an amplitude level with a direct current. For example, the DC component detector 70 is optical spectrum analyzer. The DC component of the coupled optical signal changes in accordance with the bias voltages applied to the first optical modulator 30 and the second optical modulator 40. When the appropriate bias voltages is applied to the optical modulator, an amplitude variance of the coupled optical signal becomes larger. For example, FIG. 2 indicates a characteristics of the optical modulator when the appropriate bias voltage is applied to the optical modulator. FIG. 3 indicates a characteristics of the optical modulator when the inappropriate bias voltage is applied to the optical modulator. In each of FIG. 2 and FIG. 3, a vertical axis indicates an amplitude of the electric signal converted from the coupled optical signal, a horizontal axis indicates the voltage of the drive signal, B1 and B2 indicate a bias point and R1 and R2 indicate a swing range of the voltage of the drive signal. It is understood that the amplitude change of the coupled optical signal in FIG. 2 is larger than that in FIG. 3 by comparing FIG. 2 and FIG. 3.

Figure 4:
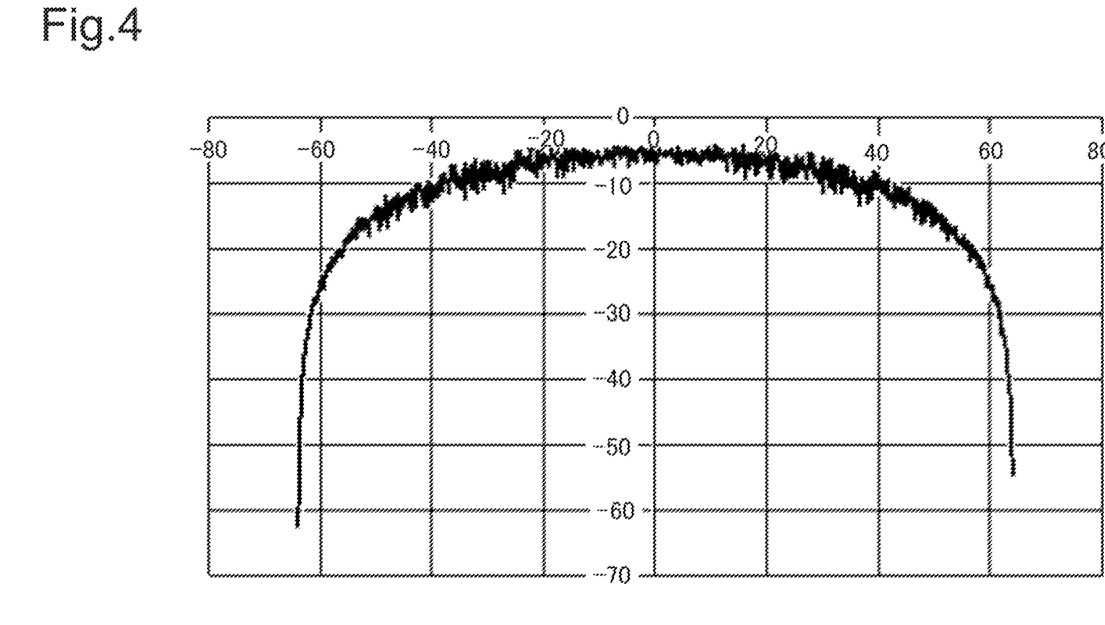
FIG. 4 is a drawing for explaining the optical transmitter in accordance with a first example embodiment of the present invention.
Figure 5:
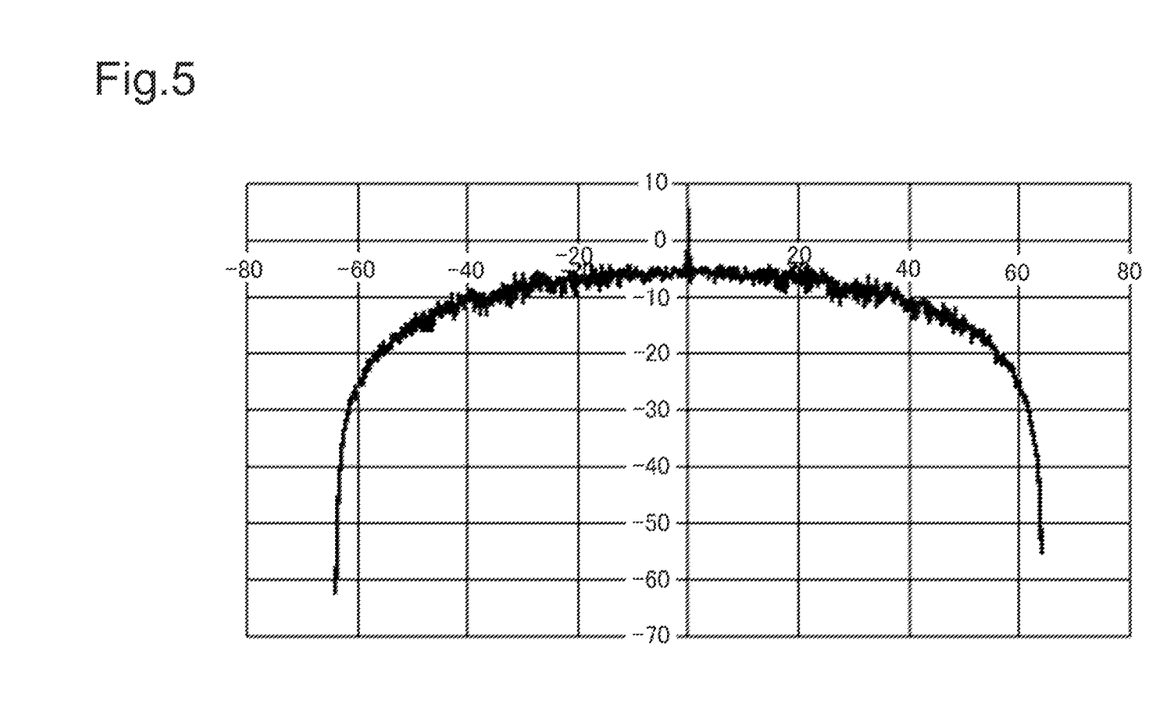
FIG. 5 is a drawing for explaining the optical transmitter in accordance with a first example embodiment of the present invention.

FIG. 4 indicates a spectrum of the coupled optical signal when the appropriate bias voltages are applied to the first optical modulator 30 and the second optical modulator 40. In FIG. 4, a horizontal axis indicates frequency of the coupled optical signal and a vertical axis indicates power of the coupled optical signal. The DC component indicated by zero on the horizontal axis is not noticeably higher than other frequency component. On the other hand, FIG. 5 indicates a spectrum of the coupled optical signal when a non-appropriate bias voltages are applied to the first optical modulator 30 and the second optical modulator 40. In FIG. 4 and FIG. 5, the horizontal axis indicates GHz and the vertical axis indicates dBm. In FIG. 5, the DC component indicated by zero on the horizontal axis is noticeably higher than other frequency component. From the above, it can be seen that the DC component of the coupled optical signal when the inappropriate bias voltage is applied changes from that when the appropriate bias voltage is applied. In other words, the bias voltages applied to the first optical modulator 30 and the second optical modulator 40 is appropriate when the variance from the DC component in the case that the appropriate bias voltage is applied is small.

The power detector 80 detects a variance amount of power of the coupled optical signal. For example, the power detector 80 is an optical detector of which sampling rate is 100 MHz. The variance amount of power of the coupled optical signal is small when the appropriate bias voltage is applied to the third optical modulator. The detail of the variance amount of power of the coupled optical signal is described later. When the appropriate bias voltages are applied, the first modulated optical signal and the second modulated optical signal are orthogonal to each other based on adjusting the phase by the third optical modulator.

Figure 6:
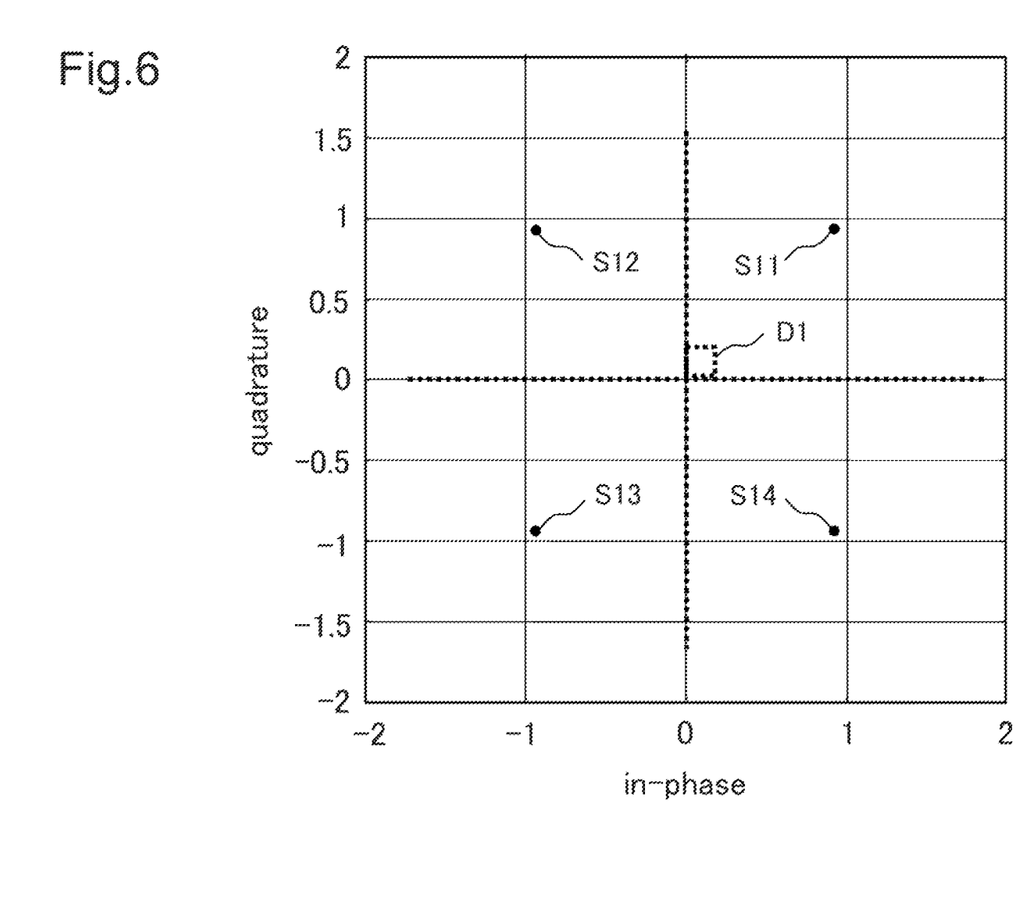
FIG. 6 is a drawing for explaining the optical transmitter in accordance with a first example embodiment of the present invention.
Figure 7:
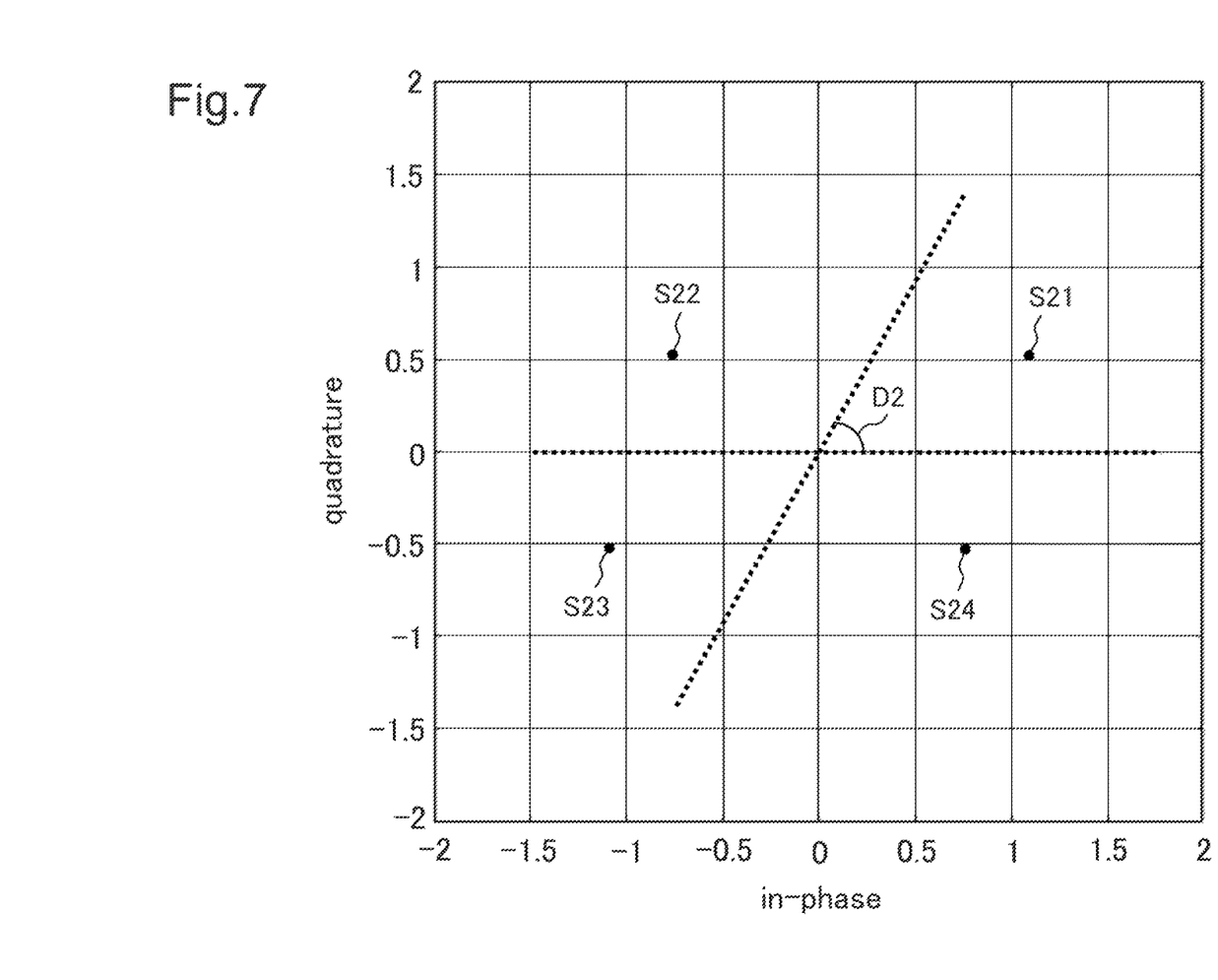
FIG. 7 is a drawing for explaining the optical transmitter in accordance with a first example embodiment of the present invention.

FIG. 6 indicates a constellation of the coupled optical signal when the appropriate bias voltage is applied to the third optical modulator 50. In FIG. 6, the constellation indicates signal points S11, S12, S13 and S14 corresponding to the coupled optical signal. This constellation also indicates that an angle D1 indicating the phase difference between the first modulated optical signal and the second modulated optical signal is 90 degrees. In this case, the signal points S11~S14 indicate the amplitude of a predetermined value. On the other hand, FIG. 7 indicates a constellation of the coupled optical signal when the non-appropriate bias voltage is applied to the third optical modulator 50. In FIG. 7, the constellation indicates that an angle D2 indicating the phase difference is not 90 degrees. In each of FIG. 6 and FIG. 7, a horizontal axis indicates phase information of the coupled optical signal and a vertical axis indicates amplitude information of the coupled optical signal. In this case, the values of amplitude indicated by the signal points S21~S24 illustrated in FIG. 7 are different from the above predetermined value. From the above, it can be seen that the power of the coupled optical signal when the inappropriate bias voltage is applied changes from the power of the coupled optical signal when the appropriate bias voltage is applied. In other words, when the variance amount of power of the coupled optical signal is small, bias voltages applied to the third optical modulator 50 are appropriate.

The controller 90 applies the first specific bias voltage identified based on the DC components detected by the direct current components detector 70 to the first optical modulator 30 and the second optical modulator 40.

An identification method of the first specific bias voltage is described below. The controller 90 has a plurality of bias voltages Vc which is a combination of bias voltage Vci to apply to the first modulator 30 and a bias voltage Vcq to apply to the second modulator 40. The controller 90 sequentially applies a plurality of bias voltages Vc to the first optical modulator 30 and the second optical modulator 40. Thereby, the DC components detector 70 can detect the variance of the DC components of the coupled optical signal when each of a plurality of bias voltages Vc is applied. The controller 90 identifies one of a plurality of bias voltages Vc as the first specific bias voltage based on a plurality of the variances for direct current components. For example, the controller 90 identifies bias voltage Vc which is applied when the smallest variance of direct current component is detected, as the first specific bias voltage.

The controller 90 applies the second specific bias voltage identified based on the variance amount of power detected by the power detector 80 to the third optical modulator 50.

An identification method of the second specific bias voltage is described. The controller 90 has a plurality of bias voltages Vp which are bias voltages applied to the third modulator 50. The controller 90 sequentially applies a plurality of bias voltages Vp to the third optical modulator 50. Thereby, the power detector 80 can detect the variance amount of the coupled optical signal when each of a plurality of bias voltages Vp was applied. For example, the controller 90 identifies bias voltage Vp which was applied when the smallest variance amount were detected, as the second specific bias voltage.

Figure 8:
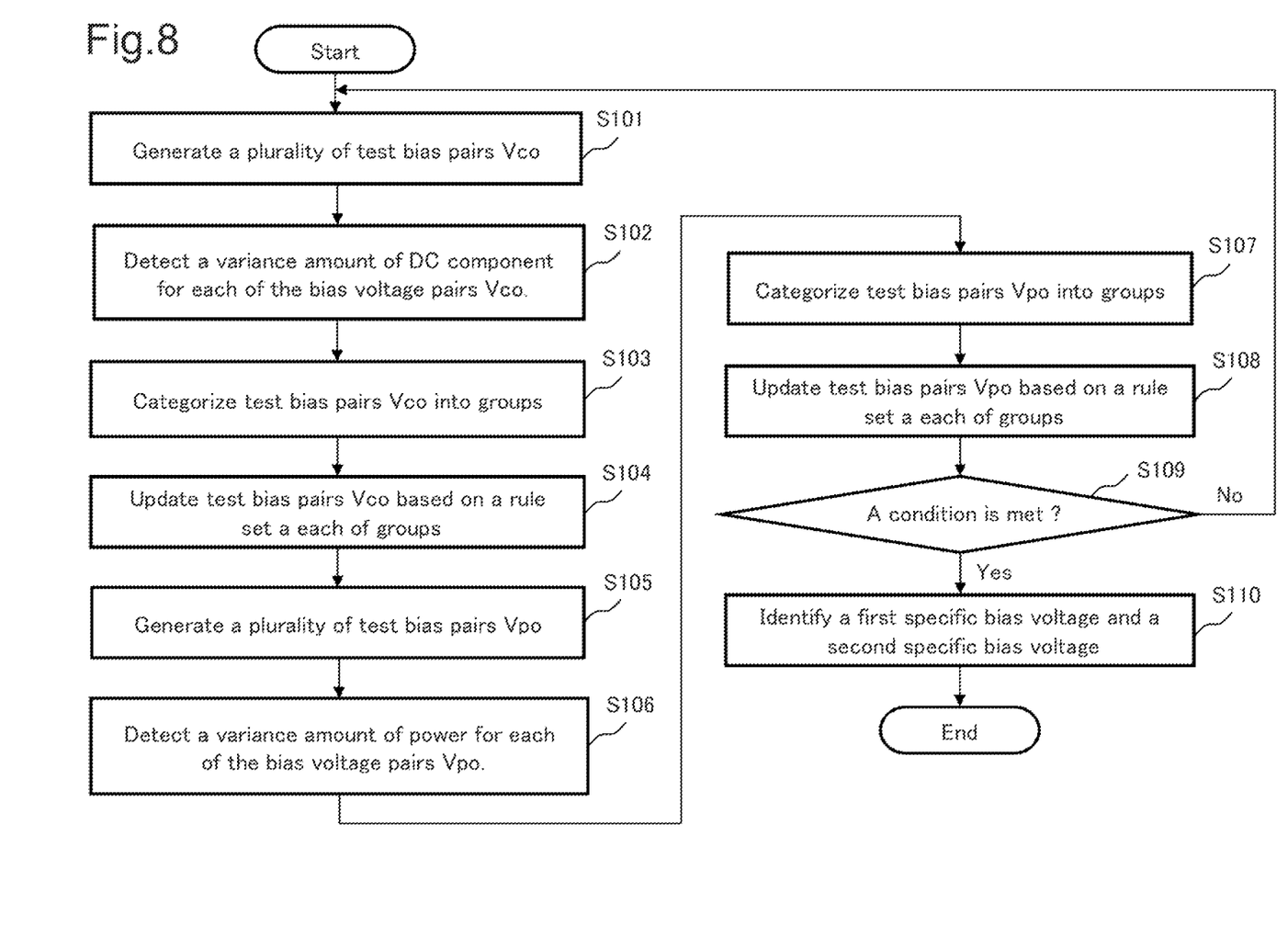
FIG. 8 is a flowchart for explaining an operation of the optical transmitter in accordance with a first example embodiment of the present invention.

Then, operation of the optical transmitter 1 is described based on FIG. 8. The controller 90 generates test bias voltage pairs Vco which are combinations of one of the bias voltages Vc and any bias voltage Vp (S101). At the time, the controller 90 applies each of bias voltages Vp, Vci and Vcq included in the test bias voltage pair Vco to each of the first optical modulator 30, the second optical modulator 40 and the third optical modulator 50.

The DC component detector 70 detects the variance of the DC component of the coupled optical signal for each of the test bias voltage pairs Vco (S102). The controller 90 categorizes the test bias voltage pairs Vco into groups based on the variance of the DC component of the coupled optical signal detected (S103). Specifically, the controller 90 categorizes the test bias voltage pairs Vco into a first group whose variance amount of the DC component is small, a second group whose variance amount of the DC component is middle or a third group whose variance amount of the DC component is high. For example, the first group is allocated with a 20 percent of a number of the test bias voltage pairs Vco. The second group is allocated with a 40 percent of a number of the test bias voltage pairs Vco. The third group is allocated with a 40 percent of a number of the test bias voltage pairs Vco.

The controller 90 updates values of the bias voltages Vc (Vci and Vcq) included in the test bias voltage pairs Vco (S104). Specifically, the values of the bias voltages Vc (Vci and Vcq) in the test bias voltage pairs Vco allocated with the first group are kept. The values of the Vc (Vci and Vcq) in the test bias voltage pairs Vco allocated with the second group are changed within a predetermined range. The values of the bias voltages Vc (Vci and Vcq) in the test bias voltage pairs Vco allocated with the third group are replaced with the other value in a random.

The controller 90 generates a plurality of test bias voltage pairs Vpo by combining any Vp to a plurality of bias voltages Vc (S105). Specifically, the controller 90 generates a plurality of test bias voltage pairs Vpo by combining any bias voltages Vp to a plurality of bias voltages Vc in the Vco allocated with the first group.

The power detector 80 detects the variance of power of the coupled optical signal for each of the test bias voltage pairs Vpo (S106).

The controller 90 categorizes the test bias voltage pairs Vpo into groups based on the variance of the power of the coupled optical signal detected (S107). Specifically, the controller 90 categorizes the test bias voltage pairs Vpo into a fourth group whose variance of the power of the coupled optical signal is small, a fifth group whose variance of the power of the coupled optical signal is middle or a sixth group whose variance of the power of the coupled optical signal is large. For example, the fourth group is allocated with a 20 percent of a number of the test bias voltage pairs Vpo. The fifth group is allocated with a 40 percent of a number of the test bias voltage pairs Vpo. The sixth group is allocated with a 40 percent of a number of the test bias voltage pairs Vpo.

The controller 90 updates values of the Vp included in the test bias voltage pairs Vpo (S108). Specifically, the values of the Vp in the test bias voltage pairs Vpo allocated with the fourth group are kept. The values of the Vp in the test bias voltage pairs Vpo allocated with the fifth group are changed within a predetermined range. The values of the Vp in the test bias voltage pairs Vpo allocated with the sixth group are replaced with the other value randomly.

The controller detects whether a condition is met (S109). For example, the condition is that a number of repeating the process S101 S109 exceeds a threshold. The condition is also that the DC component detector 70 detects the variance amount of the DC component below a threshold in the S102. The condition is also that the power detector 80 detects the variance amount of the coupled optical signal power below a threshold in the S106.

When the condition is not met (No in S109), the controller 90 returns to the process of S101. On this occasion, the controller 90 generates a plurality of the test bias voltage pairs Vco by using the bias voltages Vp allocated with the fourth group in the process of S101.

When the condition is met (Yes in S109), the controller 90 identifies the first specific bias voltage and the second specific bias voltage. Specifically, the controller 90 identifies the first specific bias voltage from the plurality of the test bias voltage pairs Vco allocated with the first group. The controller 90 also identifies the second specific bias voltage from the plurality of the test bias voltage pairs Vpo allocated with the fourth group.

For example, the controller 90 identifies the test bias voltage Vc included in the test bias voltage pair Vco applied when the variance of the DC component is the smallest, as the first specific bias voltage. The controller 90 identifies the test bias voltage Vp included in the test bias voltage pair Vpo applied when the variance of the coupled optical signal power is the smallest, as the second specific bias voltage.

As described above, the optical transmitter 1 comprises the light source 10, the splitter 20, the first optical modulator 30, the second optical modulator 40, the third optical modulator 50, the coupler 60, the DC component detector 70, the power detector 80 and the controller 90. The light source 10 outputs a light. The splitter 20 splits the light from the light source 10. The first optical modulator 30 modulates the light split by the splitter 20, and outputs the first modulated optical signal. The second optical modulator 40 modulates the light split by the splitter 20, and outputs the second modulated optical signal. The third optical modulator 50 adjusts a phase difference between the first modulated optical signal and the second modulated optical signal. The coupler 60 outputs the coupled optical signal by coupling the first modulated optical signal and the second modulated optical signal. The DC component detector 70 detects the variance of the power of the coupled optical signal. The controller 90 applies the first specific bias voltage identified based on the DC component detected by the DC component detector 70 to the first optical modulator 30 and the second optical modulator. The controller 90 also applies the second specific bias voltage identified based on the variance amount detected by the power detector 80 to the third optical modulator 50.

From the above description, it is understood that the first specific bias voltage is obtained based on the DC component of the coupled optical signal. Therefore, the low frequency dither signal is not needed in the optical transmitter 1. Further, the expensive optical detector or AD converter having the high sampling rate is not needed because the clock tone information of the coupled optical signal is not needed. Therefore, a cost of the optical transmitter 1 is reasonable and the optical transmitter can implement the automatic bias control without the dither signal.

Also, as mentioned above, the values of the bias voltages Vc included in the test bias voltage pairs Vco allocated with the second group are changed with in the predetermined range. In other words, the controller 90 changes the values of the bias voltages Vc corresponding to the coupled optical signal having the variance amount of the DC component above the first threshold which is the border between the first group and the second group.

Also, as mentioned above, the values of the bias voltages Vc included in the test bias voltage pairs Vco allocated with the third group is replaced at a random. In other words, the controller 90 replaces the values of the bias voltages Vc corresponding to the coupled optical signal having the variance amount of the DC component above the second threshold which is the border between the second group and the third group.

Thereby, the controller 90 can apply the plurality of the test bias voltages different from each other to the first optical modulator 30 and the second optical modulator. Hence, it is highly possible to identify the bias voltage Vc for making smaller the variance amount of the DC component of the coupled optical signal smaller as the first specific bias voltage.

Also, as mentioned above, the values of Vp included in the test bias voltage pair Vpo allocated with the fifth group are changed with in the predetermined range. In other words, the controller 90 changes the values of the bias voltage Vp corresponding to the coupled optical signal having the variance amount of the power above the third threshold which is the border between the fourth group and the fifth group.

Also, as mentioned above, the values of Vp included in the test bias voltage pair Vpo allocated with the sixth group are replaced at a random. In other words, the controller 90 replaces the values of the bias voltage Vp corresponding to the coupled optical signal having the variance amount of the power above the fourth threshold which is the border between the fifth group and the sixth group.

Thereby, the controller 90 can apply the plurality of the test bias voltages different from each other to the third optical modulator 50. Hence, it is highly possible to identify the bias voltage Vp for making smaller the variance amount of the power as the second specific bias voltage.

Figure 9:
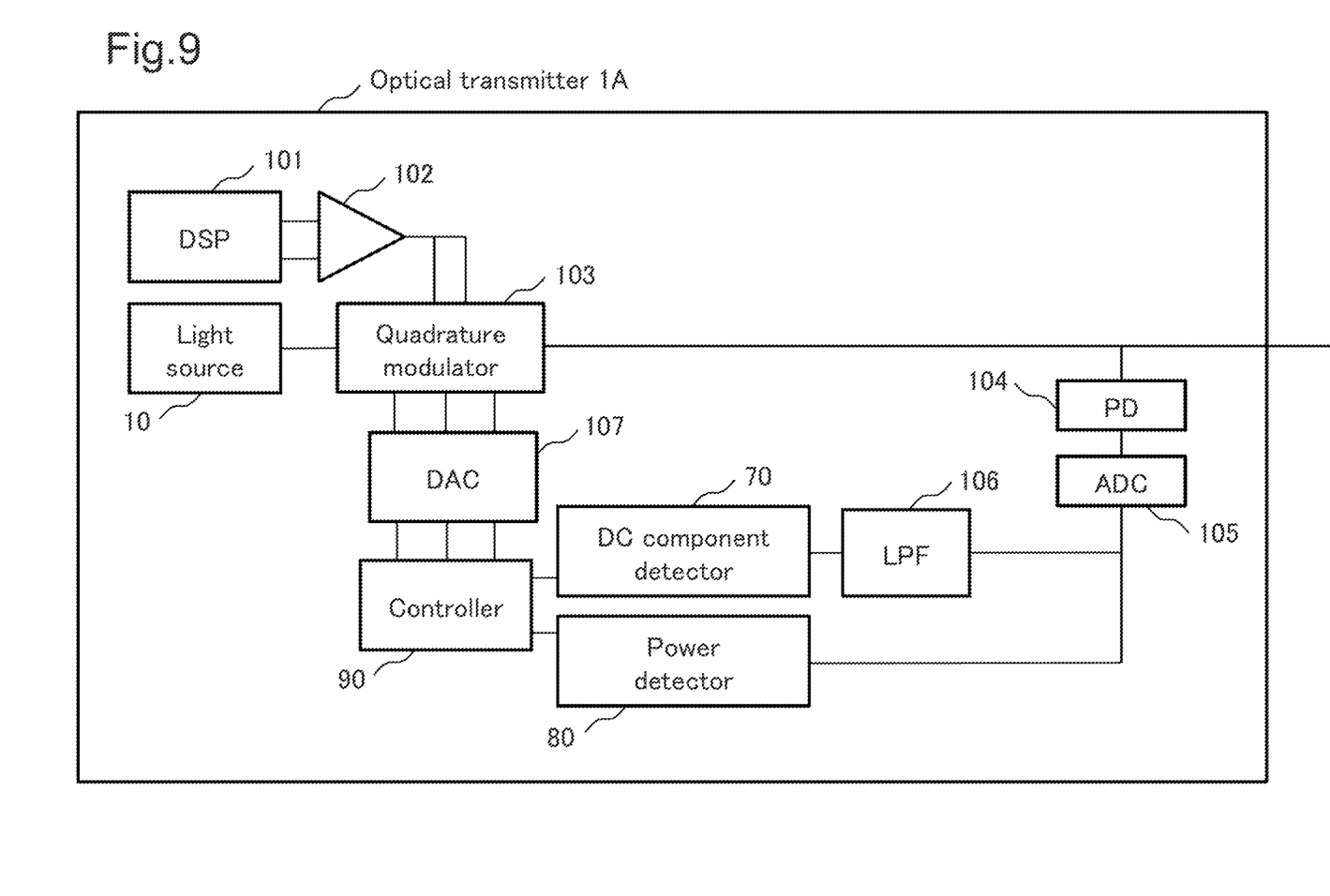
FIG. 9 is a block diagram illustrating another configuration example of an optical transmitter in accordance with a first example embodiment of the present invention.

Next, an optical transmitter 1A is described. The optical transmitter 1A is a modified example of the optical transmitter 1. As shown in FIG. 9, the optical transmitter 1A comprises a digital signal processor (DSP) 101, an amplifier 102, the light source 10, a Quadrature modulator 103, a photo detector (PD) 104, an analog to digital converter (ADC) 105, a low-pass filter (LPF) 106, the DC component detector 70, the power detector 80, the controller 90 and a digital to analog converter (DAC) 107.

The DSP 101 outputs an In-phase signal and a Quadrature signal to the amplifier based on the data stream from a client device not shown. The amplifier 102 amplifies and outputs the In-phase signal and the Quadrature signal. Quadrature modulator 103 comprises the splitter 20, the first optical modulator 30, the second optical modulator 40, the third optical modulator 50 and the coupler 60. These elements in the optical transmitter 1A comprise the function similar to the elements in the optical transmitter 1.

The photo detector 104 outputs an analog signal by converting the coupled optical signal from the Quadrature modulator 103 to the electrical signal. The ADC 105 converts the analog signal to a digital signal and outputs the digital signal to the LPF 106 and the power detector 80. The LPF 106 outputs a low-frequency component of the electrical signal from the ADC 105 to the DC component detector 70.

The controller 90 identifies the first specific bias voltage and the second specific bias voltage like the optical transmitter 1. The controller 90 applies the first specific bias voltage and the second specific bias voltage to the DAC 107. The DAC 107 converts the first specific bias voltage and the second specific bias voltage to the analog signal and applies the converted first specific bias voltage and the second specific bias voltage to the first optical modulator 30, the second optical modulator 40 and the third optical modulator 50.

Figure 10:
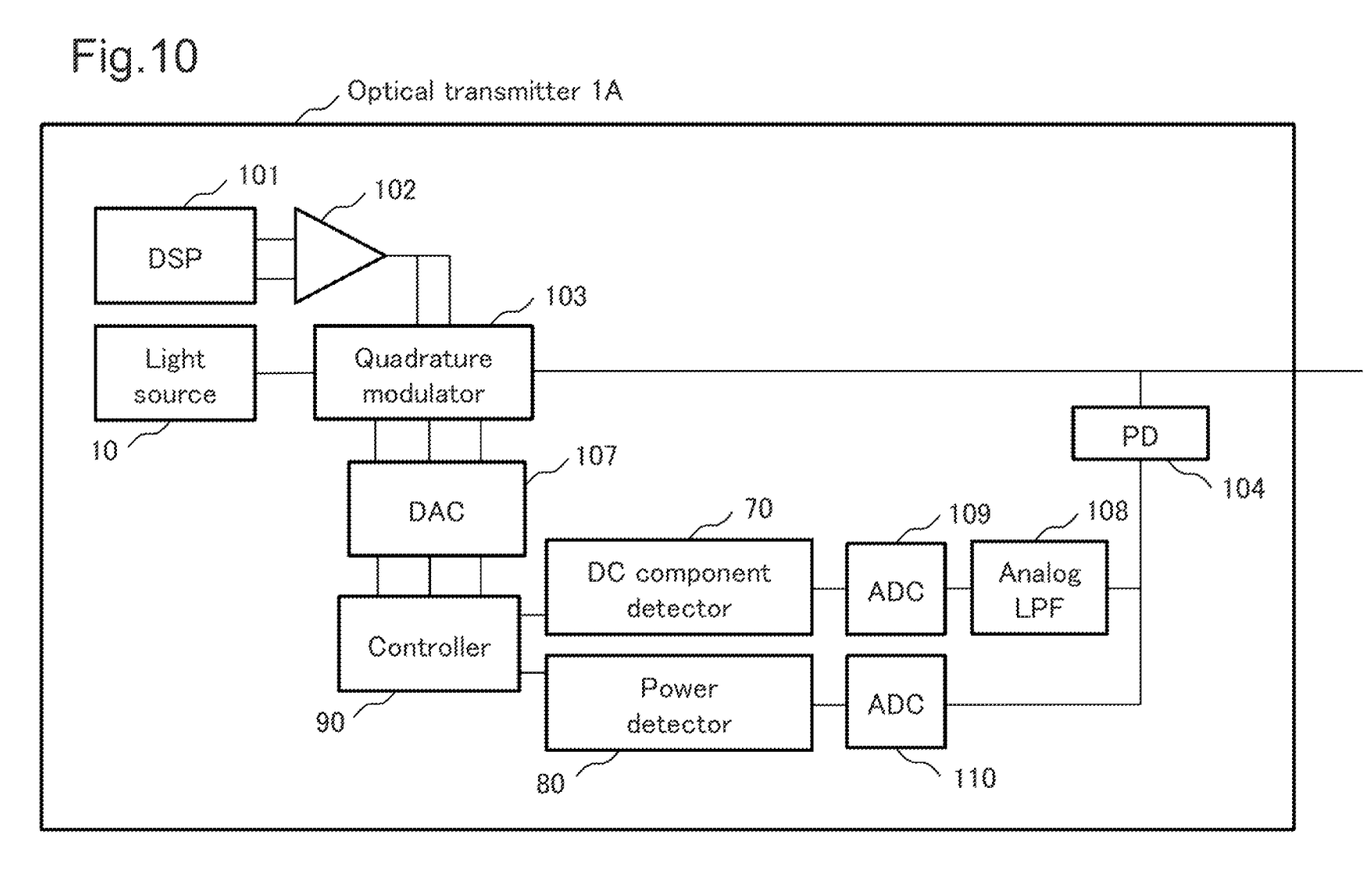
FIG. 10 is a block diagram illustrating yet another configuration example of an optical transmitter in accordance with a first example embodiment of the present invention.

Also, the optical transmitter 1A may have a structure shown in FIG. 10. The optical transmitter 1A in FIG. 10 comprises an analog LPF 108, ADC 109 and ADC 110 instead of the ADC 105.

The analog LPF 108 outputs the low-frequency component of an electrical signal from the photo detector 104 to the ADC 109. ADC 109 converts the electrical signal from the analog LPF 108 to the digital signal and outputs to the DC component detector 70. The ADC 110 converts the electrical signal from the photo detector to the digital signal and outputs to the DC component detector 70.

Second Example Embodiment

Figure 11:
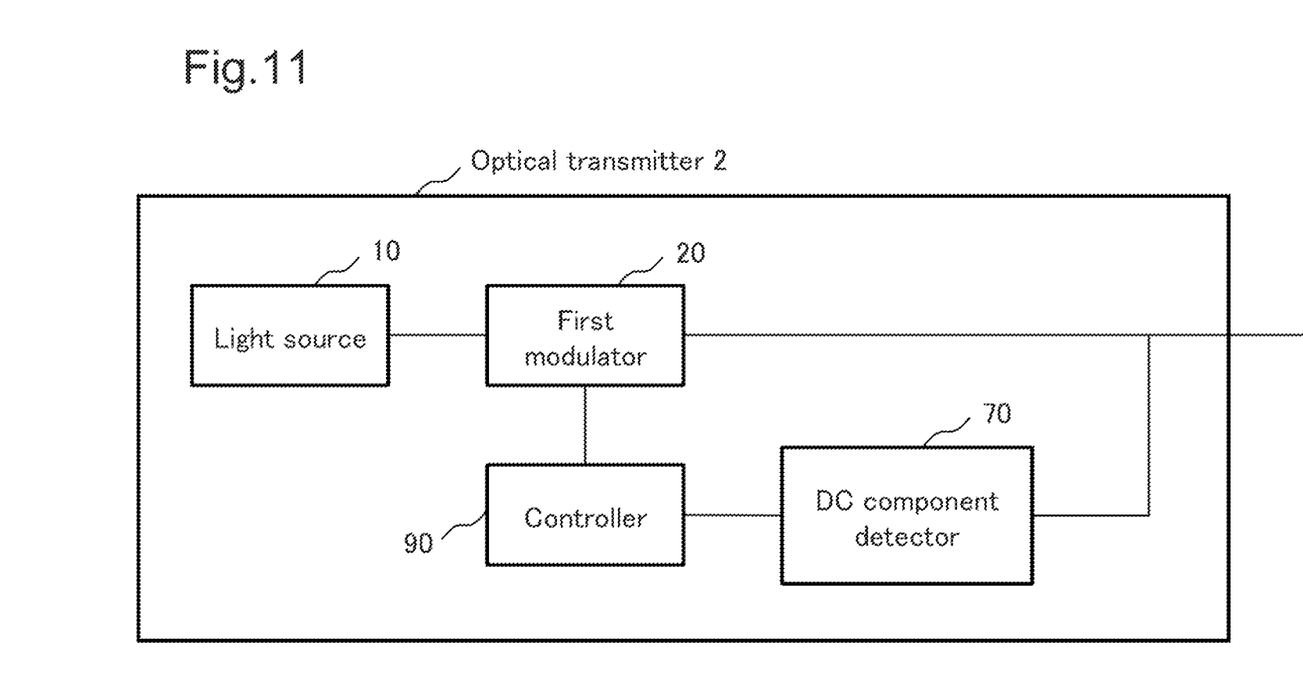
FIG. 11 is a block diagram illustrating configuration example of an optical transmitter in accordance with a second example embodiment of the present invention.

An optical transmitter 1 is explained based on FIG. 11. FIG. 11 is a block diagram illustrating configuration example of the optical transmitter 2. The optical transmitter 2 comprises a light source 10, a first optical modulator 30, a DC component detector 70 and controller 90. These elements in the optical transmitter 2 comprise the function similar to the elements in the optical transmitter 1.

The light source 10 outputs a light. The first optical modulator 30 modulates the light and outputs a first modulated optical signal. The DC component detector 70 detects a DC component of the first modulated optical signal. The controller 90 applies a first specific bias voltage identified based on the DC component to the first optical modulator 30. For example, the DC component detector 70 detects a variance of the DC component of the first modulated optical signal from a predetermined value of a DC component. For example, the controller 90 also identifies the first specific voltage based on the variance of the DC component of the first modulated optical signal.

Figure 12:
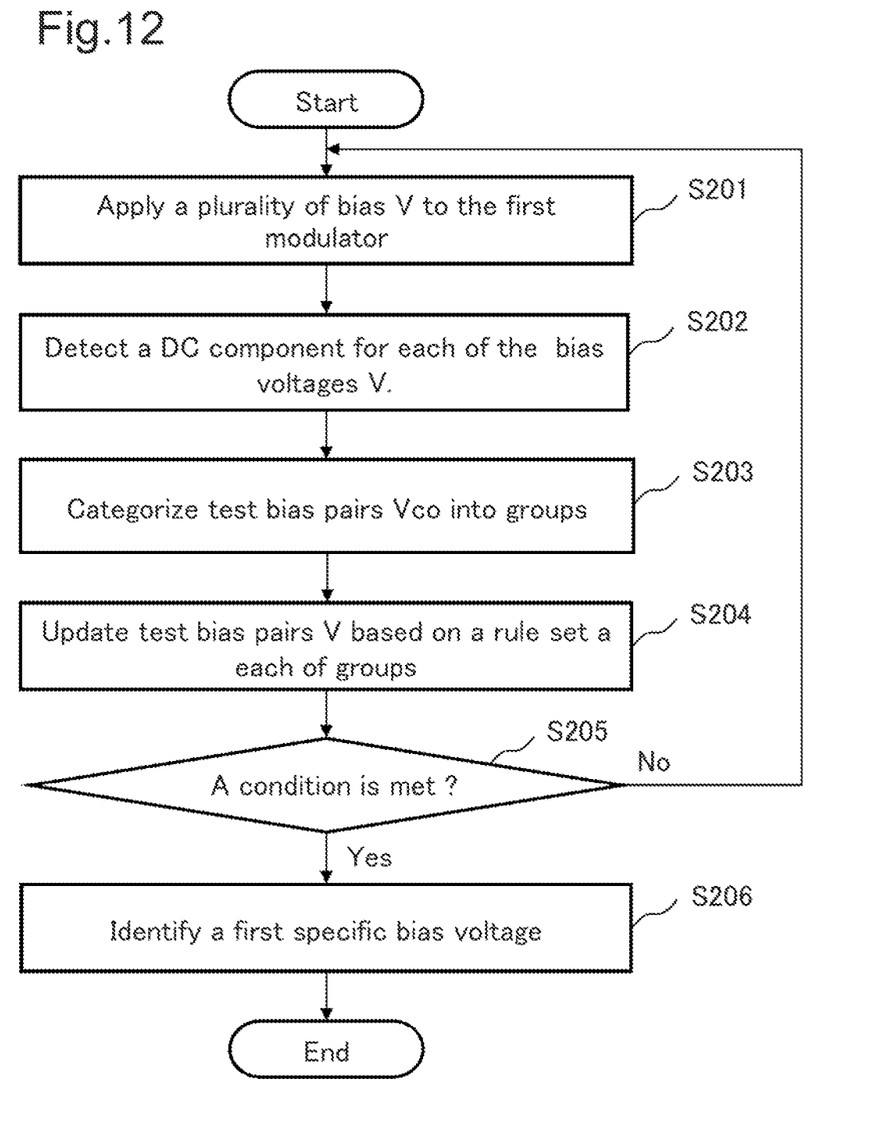
FIG. 12 is a flowchart for explaining an operation of the optical transmitter in accordance with a second example embodiment of the present invention.

The operation of the optical transmitter 2 is described based on FIG. 12. FIG. 12 is a flowchart for explaining an operation of the optical transmitter 2.

The controller 90 applies a plurality of the bias voltages V to the first optical modulator 30 (S201). The DC component detector 70 detects the DC component of the first modulated optical signal for each of the bias voltages V (S202).

The controller 90 categorizes the bias voltages V into groups based on the DC component of the first modulated optical signal detected (S203). For example, the controller 90 categorizes the bias voltages V into a first group whose variance amount of the DC component is small, a second group whose variance amount of the DC component is middle or a third group whose variance amount of the DC component is large. For example, the first group is allocated with a 20 percent of a number of the bias voltages V. The second group is allocated with a 40 percent of a number of the bias voltages V. The third group is allocated with a 40 percent of a number of the bias voltages V.

The controller 90 updates values of the V (S204). For example, the values of the bias voltages V allocated with the first group is kept. The values of the bias voltages V allocated with the second group is changed within a predetermined range. The values of the bias voltages V allocated with the third group is replaced to the other value randomly.

The controller detects whether a condition is met (S205). For example, the condition is that a number of repeating the process S201 S204 exceeds a threshold. The condition is also that the DC component detector 70 detects the variance amount of the DC component below a predetermined threshold in the S202.

When the condition is not met (No in S205), the controller 90 returns to the process of S201. On this occasion, the controller 90 uses the bias voltages V updated in the process of S204.

When the condition is met (Yes in S205), the controller 90 identifies the first specific bias voltage. For example, the controller 90 identifies the first specific bias voltage from the plurality of the bias voltages V allocated with the first group. For example, the controller 90 identifies the test bias voltage V applied when the variance of the DC component is the smallest, as the first specific bias voltage.

From the above description, it is understood that the first specific bias voltage is obtained based on the DC component of the coupled optical signal. Therefore, the low frequency dither signal is not needed in the optical transmitter 2. Further, the expensive optical detector or AD converter having the high sampling rate is not needed for that the clock tone information of the coupled optical signal is not needed. Therefore, a cost of the optical transmitter 2 is reasonable and the optical transmitter can implement the automatic bias control without the dither signal.

REFERENCE SIGNS LIST 1, 1A, 2 optical transmitter
10 optical light source
20 splitter
30 first optical modulator
40 second optical modulator
50 third optical modulator
60 coupler
70 DC component detector
80 variance detector
90 controller
101 DSP
102 AMP
103 Quadrature modulator
104 PD
105, 109, 110 ADC
106 LPF
107 DAC
108 Analog LPF

The invention claimed is:

1. An optical transmitter comprising:
a light source configured to output a light;
a first optical modulator configured to modulate the light and output a first modulated optical signal;
a DC component detector configured to detect a DC component of the first modulated optical signal; and
a controller configured to apply a first specific bias voltage, identified using the DC component, to the first optical modulator,
wherein the controller is configured to identify the first specific bias voltage using a variance amount of the DC component of a modulated optical signal generated by each of a plurality of bias voltages,
wherein the controller is configured to change values of a bias voltage corresponding to a modulated optical signal having the variance amount of the DC component above a first threshold within a predetermined range,
wherein the controller is configured to replace the values of the bias voltage corresponding to the modulated optical signal having the variance amount of the DC component above a second threshold, and
wherein the second threshold is bigger than the first threshold.

2. An optical transmitter comprising:
a light source configured to output a light;
a first optical modulator configured to modulate the light and output a first modulated optical signal;
a DC component detector configured to detect a DC component of the first modulated optical signal;
a controller configured to apply a first specific bias voltage, identified using the DC component, to the first optical modulator;
a splitter configured to split the light;
a second optical modulator configured to modulate the light and output a second modulated optical signal;
a third modulated optical modulator configured to adjust a phase difference between the first modulated optical signal and the second modulated optical signal;
a coupler configured to couple the first modulated optical signal and the second modulated optical signal and output a coupled optical signal; and
a variance detector configured to detect a variance amount of power of the coupled optical signal,
wherein the DC component detector is configured to detect a DC component of the coupled optical signal, and
wherein the controller is configured to apply the first specific bias voltage, identified using the DC component, to the first optical modulator and the second optical modulator and to apply a second specific bias voltage, identified using the variance amount, to the third optical modulator.

3. The optical transmitter according to claim 2, wherein the controller is configured to identify the second specific bias voltage by detecting the variance amounts of power of the coupled optical signal generated using each of the plurality of bias voltages applied to the third optical modulator.

4. The optical transmitter according to claim 3, wherein the controller is configured to change the values of the bias voltage corresponding to the coupled optical signal having the variance amount of the power above a third threshold within a predetermined range.

5. The optical transmitter according to claim 4, wherein the controller is configured to replace the values of the bias voltage corresponding to the coupled optical signal having the variance amount of the power above a fourth threshold, and
wherein the fourth threshold is bigger than the third threshold.

6. A method of transmitting an optical signal, the method comprising:
outputting a light;
modulating the light and outputting a first modulated optical signal by a first optical modulator;
detecting a DC component of the first modulated optical signal;
applying a first specific bias voltage, identified using the DC component, to the first optical modulator;
identifying the first specific bias voltage using a variance amount of the DC component of a modulated optical signal generated by each of a plurality of bias voltages;
changing values of a bias voltage corresponding to the modulated optical signal having the variance amount of the DC component above a first threshold within a predetermined range; and
replacing the values of the bias voltage corresponding to a modulated optical signal having the variance amount of the DC component above a second threshold,
wherein the second threshold is bigger than the first threshold.

* * * * *